(12) United States Patent
Chiou et al.

(10) Patent No.: US 6,841,896 B2
(45) Date of Patent: Jan. 11, 2005

(54) DUAL SUPPLY VOLTAGES CONVERTER AND METHOD

(75) Inventors: Ming-Hsiang Chiou, Hsinchu (TW); Chen-Yu Hsiao, Pingtung (TW)

(73) Assignee: Frontend Analog and Digital Technology Corporation, Taipei (TW)

( * ) Notice: Subject to any disclaimer, the term of this patent is extended or adjusted under 35 U.S.C. 154(b) by 0 days.

(21) Appl. No.: 10/414,093

(22) Filed: Apr. 16, 2003

(65) Prior Publication Data

US 2003/0227786 A1 Dec. 11, 2003

(30) Foreign Application Priority Data

Jun. 7, 2002 (TW) ....................................... 91112479 A

(51) Int. Cl.$^7$ ................................................. H02J 1/10
(52) U.S. Cl. ........................................ 307/28; 307/81
(58) Field of Search .............................. 323/272, 284; 307/80, 81, 43, 28

(56) References Cited

U.S. PATENT DOCUMENTS 6,362,606 B1 * 3/2002 Dupuis et al. .............. 323/272

* cited by examiner

Primary Examiner—Shawn Riley
(74) Attorney, Agent, or Firm—Rosenberg, Klein & Lee

(57) ABSTRACT

A dual supply voltages converter divides a supply voltage by a constant to produce a feature voltage larger than one when the supply voltage is a first voltage and smaller than 1 when the supply voltage is a second voltage and squares the feature voltage for comparing with itself. After squared, a value larger than one will larger than itself and a value small than 1 will smaller than itself. As a result, the supply voltage is determined to be the first or second voltage and thereby to be converted to the desired output voltage.

8 Claims, 3 Drawing Sheets

US 6,841,896 B2

DUAL SUPPLY VOLTAGES CONVERTER AND METHOD

FIELD OF THE INVENTION

The present invention relates generally to a voltage converter, and more particularly to a circuit and method to convert dual supply voltages to single supply voltage.

BACKGROUND OF THE INVENTION

The dual supply voltages operationable circuit is the trend of the integrated circuit (IC) design, and more and more circuit are designed for normally operating with dual supply voltages even multiple supply voltages. Therefore, the application of supply voltage conversion circuit is quite popular, such as communication, wireless local area network (WLAN), analog-to-digital circuit in optical fiber communications, digital video disc (DVD), liquid crystal display (LCD) driving circuit, motherboard, central processing unit (CPU), generally consumer electronic apparatus, or consumer integrated circuit all need this kind of conversion circuit. Hence, if such conversion circuit is successfully designed and produced, it will bring unlimited trade.

In many IC design, the designed circuit must be operated under different supply voltages at the same time, and the external conversion circuit must be modified without changing the internal supply voltage and design of the circuit. Designing a dual supply voltages converter is expected for connecting the available supply voltage from external to core circuit, and, for example, typically 5V and 3.3V are successfully converted to 3.3V for internal circuit. Accordingly, the designed circuit will be competitive and tradable.

However, in the current IC design, a bandgap reference circuit or the traditional converter circuit is used in the most design of the dual supply voltages converter. In using bandgap reference circuit, the difference of the provided supply voltages cannot be too large such as a few hundreds of milivolts, and in using traditional converter circuit, the volume of whole circuit will be quite huge and cannot be integrated.

SUMMARY OF THE INVENTION

One object of the present invention is to design a new and practical supply voltage converter with a new concept, which means to design a dual supply voltages converter without changing the supply voltage and design of the core circuit to connect the supply voltage from external to core circuit, and no matter how much the inputted supply voltage is, it can be converted to a voltage with fixed output value and provided to the core circuit.

Accordingly, a dual supply voltages converter includes an input, a control signal generator and an output circuit. The input is connected with a supply voltage at a first or a second voltage, and the first voltage is larger than the second one; the control signal generator is connected to the input and generates a control signal in accordance with the supply voltage as the first or second voltage. The control signal is at a first logic state when the supply voltage is the first voltage, and at a second logic state when the supply voltage is the second voltage; the output circuit includes a first and a second paths each connected between the input and an output, and the two paths are switched by the control signal. When the control signal is at the first logic state, the first path is turned on and the first voltage is converted to a third voltage on the output; when the control signal is at the second logic state, the second path is turned on and the second voltage is converted to the third voltage on the output. The inputted supply voltage at different levels will be automatically identified and converted with different ratio, and a fixed voltage or single supply voltage is outputted to the core circuit.

In a preferred embodiment of the present invention, the control signal generator divides the inputted supply voltage by a constant to product a feature voltage. The feature voltage is larger than one when the supply voltage is the first voltage, and the feature voltage is smaller than one when the supply voltage is the second voltage. Then the feature voltage is squared and compared with itself. After squared, a value larger than 1 will be larger than itself, and a value smaller than 1 will be smaller than itself. As a result, the supply voltage is determined to be the first or second voltage, and the output circuit decides a proper conversion ratio and converts the supply voltage to the desired output voltage.

BRIEF DESCRIPTION OF THE DRAWINGS

The above and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

The voltage converter is a circuit that converts several different supply voltages to a single supply voltage. With this circuit design, the application of the designed circuit will be more popular and competitive. The main object and function of the invention is to design a new dual voltages converter applied to the design of the integrated circuit. An embodiment is shown hereinafter, in which several values and circuits are designed for exemplary purpose, and various modifications and variations can be made according to the present invention without departing from the scope or spirit of the present invention.

Figure 1:
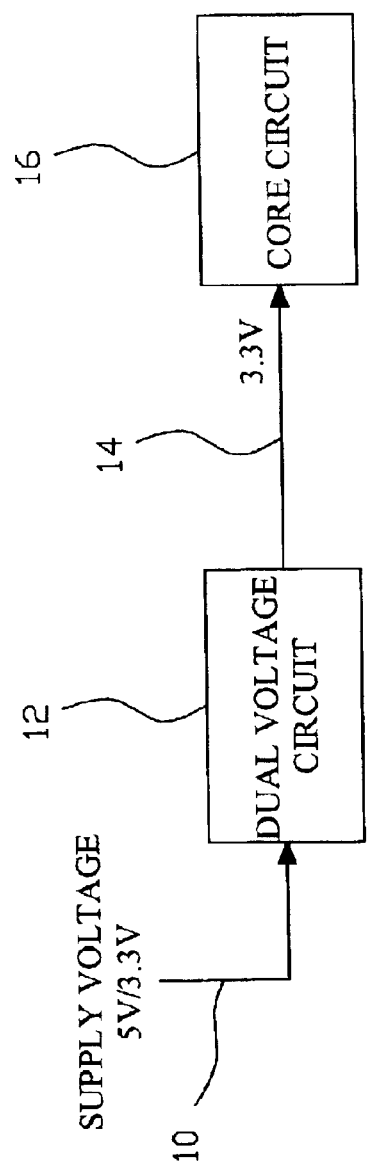
FIG. 1 shows a scheme for the dual voltage converter according to the present invention.

FIG. 1 is the scheme for the dual voltage converter according to the present invention. An input 10 is connected with a dual voltage converter 12 to provide a supply voltage at 5V or 3.3V. Whether the dual voltages converter 12 is connected to 5V or 3.3V, the dual voltage converter 12 generates an output 14 of 3.3V to provide to the core circuit 16.

Figure 2:
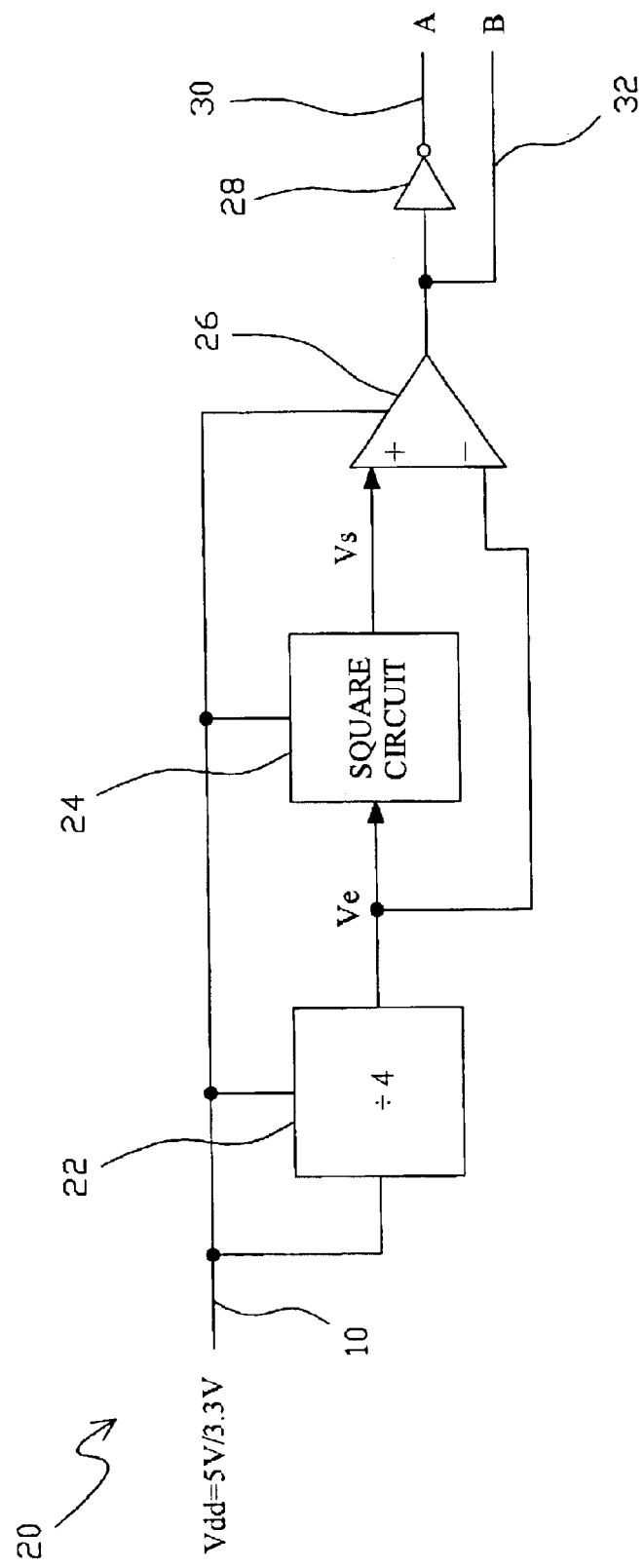
FIG. 2 is an embodiment for the control signal generator in the dual voltage converter of FIG. 1.

The main function of the dual voltage converter 12 is converting two different provided supply voltages to a single supply voltage. At first, the provided supply voltage is determined to be 5V or 3.3V, and then the supply voltage is converted to the single voltage for the core circuit 16 by a simple converter circuit. To determine the supply voltage connected to the dual voltages converter 12 is 5V or 3.3V, FIG. 2 shows an embodiment 20 for the control signal generator in the dual voltage converter 12 of FIG. 1. The input 10 is connected to a division circuit 22 for the supply voltage Vdd to be divided by four to produce a feature voltage Ve, and the feature voltage Ve is squared by a square circuit 24 to provide a squared voltage Vs. The outputs of the division circuit 22 and the square circuit 24 are connected to a comparator 26 to compare the feature voltage Ve with the squared voltage Vs. The output of the comparator 26 is connected to an inverter 28, and, as a result, the outputs of the inverter 28 and the comparator 26 provide a pair of complementary control signals 30 and 32, by which the decision of the logic states is further described in the following.

When the input 10 is connected with the supply voltage Vdd of 5V, the division circuit 22 produces the feature voltage $$Ve(5\ V) = Vdd \div 4$$
$$= 5\ V \div 4$$
$$= 1.25\ V.$$

When the input 10 is connected with the supply voltage Vdd of 3.3V, the division circuit 22 produces the feature voltage $$Ve(3.3\ V) = Vdd \div 4$$
$$= 3.3\ V \div 4$$
$$= 0.825\ V.$$

In other words, the feature voltage Ve(5V) of the 5V supply voltage is larger than one, and the feature voltage Ve(3.3V) of the 3.3V supply voltage is smaller than one.

Then, the feature voltage Ve is squared to produce a squared voltage Vs by a square circuit 24. The squared voltage of the feature voltage Ve(5V) for the 5V supply voltage is $$Vs(5\ V) = (1.25)^2$$
$$= 1.5625,$$

and $$Vs(5\ V) = 1.5625 > 1.25 = Ve(5\ V).$$

In contrast, the squared voltage of the feature voltage Ve(3.3V) for the 3.3V supply voltage is $$Vs(3.3\ V) = (0.825)^2$$
$$= 0.68\ V,$$

and $$Vs(3.3\ V) = 0.68 < 0.825 = Ve(3.3\ V).$$

In other words, the feature voltage Ve(5V) of the 5V supply voltage becomes larger after squared, and the feature voltage Ve(3.3V) of the 3.3V supply voltage becomes smaller after squared. A characteristic is used that a value larger than one gets greater after squared, and a value smaller than one gets smaller after squared. As a result, the different supply voltages Vdd can be determined.

The output Vs of the square circuit 24 and the output Ve of the division circuit 22 are compared by the comparator 26 to provide the complementary control signals 30 and 32. If the voltage of the supply voltage Vdd is 5V, the squared voltage Vs(5V) is larger than the feature voltage Ve(5V) and the logic states of the control signal 30 and 32 are A=0, and

B=1.

Contrarily, if the voltage of the supply voltage Vdd is 3.3V, the squared voltage Vs(3.3V) is smaller than the feature voltage Ve(3.3V) and the logic states of the control signal 30 and 32 are A=1, and

B=0.

The voltage of the supply voltage Vdd is thus determined and the corresponding control signals 30 and 32 are provided according to the level of the supply voltage Vdd.

Figure 3:
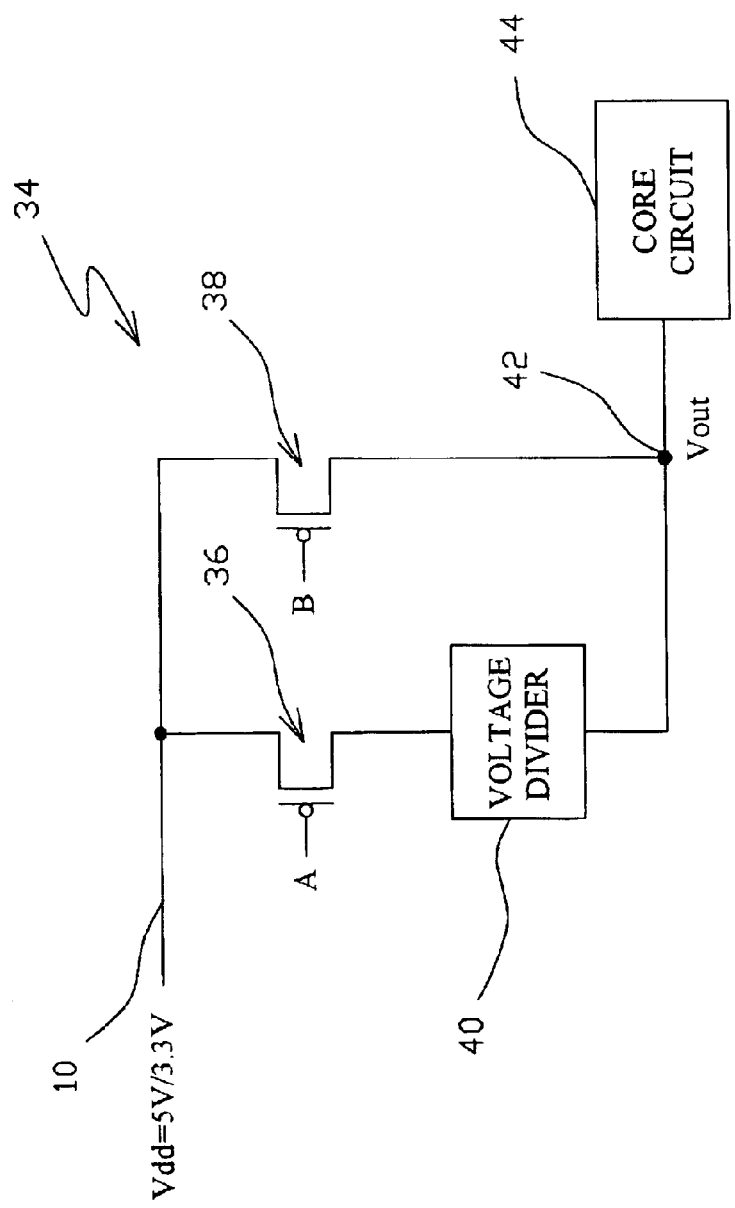
FIG. 3 is an embodiment for the output circuit in the dual voltage converter of FIG. 1.

After determining the inputted supply voltage Vdd is 5V or 3.3V, the supply voltage Vdd is converted to the desired voltage. FIG. 3 shows the embodiment 34 for the output circuit in the dual voltage converter 12, which includes two paths arranged from the input 10 to the output 42. The first path comprises a PMOS 36 and a voltage divider 40, and the second path comprises a PMOS 38. The control signals A and B aforementioned are connected to the gates of the PMOSes 36 and 38, respectively, and switch between the two paths to provide different conversion ratio by switching the MOS switches 36 and 38. As foregoing mentioned, when the supply voltage Vdd is 5V, by the operation of the control signal generator 20, A=0 and B=1, the PMOS 36 will be turned on and the PMOS 38 will be turned off. The 5V supply voltage Vdd is converted to the output voltage Vout of 3.3V through the PMOS 36 and divided by the resistors in the voltage divider 40 to provide to the core circuit 44. On the other hand, when the supply voltage Vdd is 3.3V, by the operation of the control signal generator 20, A=1 and B=0, the PMOS 36 will be turned off and the PMOS 38 will be turned on. The 3.3V supply voltage Vdd is converted to the output voltage Vout of 3.3V through the PMOS transistor 38 and connection to the output 42 to provide to the core circuit 44. As a result, whether the supply voltage is 5V or 3.3V, the output 42 always provides fixed voltage 3.3V to the core circuit 44.

The invented converter converts different supply voltages to a single voltage by use of small circuit, and the circuit is achieved by CMOS process and is economic.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A dual supply voltages converter comprising:

an input for being connected with a supply voltage at a first voltage or a second voltage smaller than the first voltage;

a control signal generator connected to the input for generating a control signal at a first logic state responsive to the first voltage and a second logic state responsive to the second voltage, the control signal generator including:

(a) a division circuit for dividing the supply voltage by a constant to produce a feature voltage larger than one when the supply voltage is the first voltage and smaller than one when the supply voltage is the second voltage;

(b) a square circuit for squaring the feature voltage to produce a squared voltage; and (c) a comparator for comparing the feature voltage with the squared voltage to set the control signal to the first logic state when the squared voltage is larger than the feature voltage and to the second logic state when the squared voltage is smaller than the feature voltage; and, an output circuit including a first and a second paths each connected between the input and an output for being switched by the control signal to turn on the first path responsive to the first logic state to thereby transform the first voltage to a third voltage and to turn on the second path responsive to the second logic state to thereby transform the second voltage to the third voltage on the output.

2. The converter of claim 1, further comprising an inverter connected with the control signal to produce a complementary signal connected to the output circuit.

3. The converter of claim 2, wherein the second path includes a MOS with a gate connected to the complementary signal to turn on the second path.

4. A dual supply voltages converter comprising:
  an input for being connected with a supply voltage at a first voltage or a second voltage smaller than the first voltage;
  a control signal generator connected to the input for generating a control signal at a first logic state responsive to the first voltage and a second logic state responsive to the second voltage; and,
  an output circuit including a first and a second paths each connected between the input and an output for being switched by the control signal to turn on the first path responsive to the first logic state to thereby transform the first voltage to a third voltage and to turn on the second path responsive to the second logic state to thereby transform the second voltage to the third voltage on the output, the first path including a voltage divider to produce the third voltage from the first voltage.

5. A method for converting dual supply voltages to single supply voltage, the method comprising the steps of:
  inputting a supply voltage at a first voltage or a second voltage smaller than the first voltage;
  generating a control signal at a first logic state responsive to the first voltage and a second logic state responsive to the second voltage, the step of generating a control signal includes the steps of:
    (a) dividing the supply voltage by a constant to produce a feature voltage larger than one when the supply voltage is the first voltage and smaller than one when the supply voltage is the second voltage;
    (b) squaring the feature voltage to produce a squared voltage; and
    (c) comparing the feature voltage with the squared voltage to set the control signal to the first logic state when the squared voltage is larger than the feature voltage and to the second logic state when the squared voltage is smaller than the feature voltage; and,
  switching by the control signal to turn on a first path responsive to the first logic state to thereby transform the first voltage to a third voltage and to turn on a second path responsive to the second logic state to thereby transform the second voltage to the third voltage.

6. The method of claim 5, wherein the first voltage is divided to produce the third voltage when the first path is turn on.

7. The method of claim 5, further comprising inverting the control signal to produce a complementary signal.

8. The method of claim 7, further comprising connecting a MOS in the second path to turn on the second path by switching the MOS by the complementary signal.

* * * * *